United States Statutory Invention Registration [19]

[11] Reg. Number: H437

Conrad [43] Published: Feb. 2, 1988

[54] LASER MEDIUM FOR DYE LASERS

[75] Inventor: Raymond W. Conrad, Russellville, Ala.

[73] Assignee: The United States of America as represented by the Secretary of the Army, Washington, D.C.

[21] Appl. No.: 62,289

[22] Filed: Jun. 15, 1987

[51] Int. Cl.[4] ..... H01S 3/20; C09K 11/06

[52] U.S. Cl. ..... 372/53; 252/301.17

[56] References Cited

PUBLICATIONS

G. N. Dul'nev, et al. *Sov. Tech. Phys. Lett* 4 (9), Sep. 1978, paper entitled "Tunable Solid-State Laser with a Microcomposition Matrix Active Medium."

*Primary Examiner*—Stephen C. Buczinski

*Assistant Examiner*—Linda J. Wallace

*Attorney, Agent, or Firm*—John C. Garvin, Jr.; Freddie M. Bush; James T. Deaton

[57] ABSTRACT

A polydisperse aggregate of very small solid particles that form voids therebetween with a lasing dye solution in said voids to form a laser host medium is disclosed.

4 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

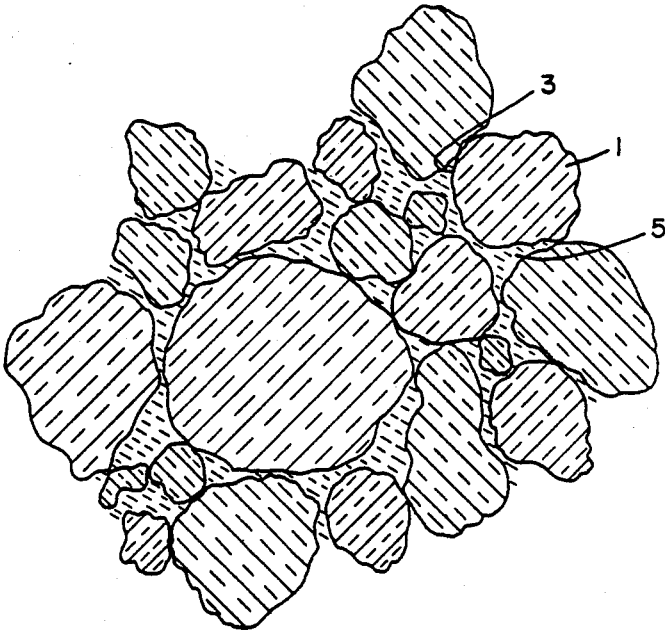
3
1
5

LASER MEDIUM FOR DYE LASERS

DEDICATORY CLAUSE

The invention described herein may be manufactured, used, and licensed by or for the government for governmental purposes without the payment to me of any royalties thereon.

BACKGROUND OF THE INVENTION

In the past, researchers have reported on a type of dye laser that uses a microcomposition matrix quartz medium. Researchers usually refer to this material as microporous quartz. Lasing has been observed when this material was filled with a dye solution of Rhodamine 6G and pumped with a frequency doubled neodyium or copper vapor laser. The most notable characterists of this laser is the enormous increase of the dye lifetime. This was attributed to the dye solution being trapped in the pores of the permeable microporous quartz with the result that the decomposed dye and its decomposition products were constrained to a very localized environment in which pumped photons could promote the recombination of the decomposed dye with its decompostion products to form the original dye. However, the dye eventually decomposes or heats to a temperature where lasing no longer can occur. Replacing the dye unfortunately takes a very long time since it takes considerable time to allow the dye to migrate into the micropores of the quartz. Therefore, there is a need for a way in which the dye can be readily replaced in a short time.

Accordingly, it is an object of this invention to provide a polydisperse aggregate of very small solid particles to form a laser host that has characteristics superior to previous microporous media.

Another object of this invention is to provide a laser host medium which combines the advantages of the permeable microporous medium with the very desirable capability of rapidly replacing the dye and even the ability to transport the lasing medium to effect heat exchange.

Other objects and advantages of this invention will be obvious to those skilled in this art.

SUMMARY OF THE INVENTION

In accordance with this invention, a new laser medium for dye lasers is provided that includes a host material composed of an aggregate of very small polydisperse particles of a material that has appropriate thermal, mechanical and optical properties, such as quartz and in which the material has interstitial voids therebetween that are filled with a lasing dye solution.

BRIEF DESCRIPTION OF THE DRAWINGS

The single FIGURE of the drawing illustrates a host material of aggregate particles with voids between the various particles that are filled with a lasing dye solution.

DESCRIPTION OF THE PREFERRED EMBODIMENT

Referring now to the drawing, a host material 1 of quartz or other suitable material particle is provided and this material is an aggregate of very small, polydisperse particles which form a random assemblage of voids 3 between the particles which voids are filled with lasing dye solution 5 such as Rhodamine 6G. This dye solution has a refractive index equal to that of material 1. Material 1 is preferably quartz and of variable size ranges from about 1 micron to about 15 microns. The particles can be other than of random size. They can be spherical particles or other shaped particles to define the voids between the particles for the lasing dye solution. Other solid material having appropriate thermal, mechanical and optical properties can be substituted for the quartz. With the dye in the voids formed between the particles of the quartz material, the material can be transported to and from a laser cavity using pumping or fluidized bed transport techniques. The dye solution after being used can be quickly replaced by simple dilution and rinsing of the material forming the voids and placing additional dye solution in the voids to prepare the material for another lasing application.

The laser dye lifetime in the lasing medium is realized by constraining by a myriad of very small volumes of the dye so that a dynamic equilibrium between decomposition and recombination can be established. That is, the products of the decomposition reaction must be maintained in close proximity and not allowed to diffuse away so that the probability of a photo-initiated recombination is high. In prior work, this was done by preparing a quartz matrix with microscopic pores, and allowing the dye solution to diffuse into the pores. The refractive index of the dye solution was adjusted so as to be equal to that of the quartz to thus reduce scattering of the light.

This invention improves on the referenced prior art by using a polydisperse mixture of quartz or other suitable material particles with a very small average dimension so that the polydisperse mixture forms a myriad of very tiny interstitial voids between the particles which voids are filled with the dye solution. The dye solution is thus contained in the voids just as in the case of the pores of the microporous quartz material. However, the permeable aggragate mixture of applicant's invention can be pored, pumped, or otherwise transported for the purpose of heat exchange or dye replacement.

I claim:

1. A laser host medium comprising an aggregate of very small polydisperse particles of quartz or other solid material having appropriate thermal, mechanical and optical properties for laser material, said particles having sizes from about 1 micron to about 15 microns, said particles defining interstitical voids between the particles and a lasing dye solution filling said voids.

2. A laser host medium as set forth in claim 1, wherein said particles are made of quartz and said lasing dye solution is Rhodamine 6G.

3. A laser host medium as set forth in claim 1, wherein said particles are of random shapes.

4. A laser host material as set forth in claim 3, wherein said particles are of different sizes, said particles are made of quartz, and said lasing dye solution is Rhodamine 6G.

* * * * *